Aug. 27, 1946. M. N. FAIRBANK ET AL 2,406,361
MOLD FOR USE IN THE MANUFACTURE OF OPTICAL ELEMENTS
Filed Oct. 16, 1942
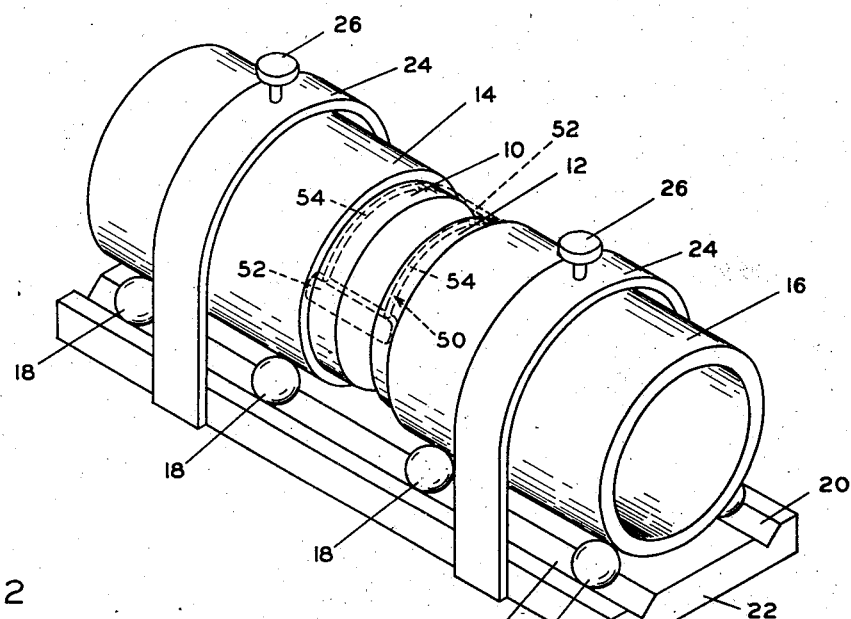
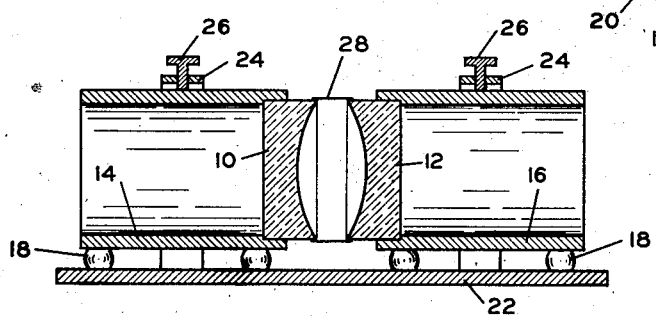
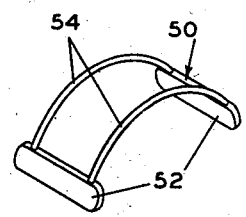
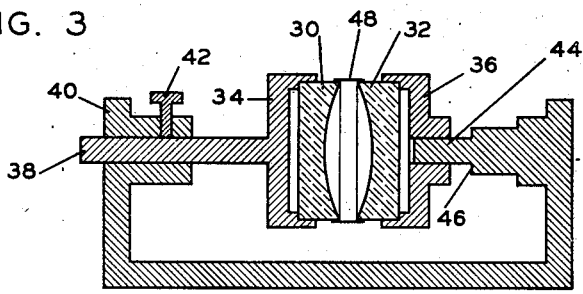
Murry N. Fairbank
and
Dexter P. Cooper, Jr. INVENTORS
BY Donald L. Brown
Attorney Patented Aug. 27, 1946

2,406,361

UNITED STATES PATENT OFFICE 2,406,361

MOLD FOR USE IN THE MANUFACTURE OF OPTICAL ELEMENTS

Murry N. Fairbank, Weston, and Dexter P. Cooper, Jr., Cambridge, Mass., assignors to Polaroid Corporation, Cambridge, Mass., a corporation of Delaware Application October 16, 1942, Serial No. 462,260

7 Claims. (Cl. 18—34)

This invention relates to an improved mold for use in the manufacture of lenses and like optical elements of polymerized synthetic plastics, resins and the like.

An object of the invention is to provide a mold of the character described adapted primarily for use in connection with the formation of lenses of polymerized plastics and like materials, the mold walls being mounted for relative motion toward each other so that after the plastic material has been introduced into the mold and during the polymerization thereof shrinkage of the plastic arising from polymerization may be compensated for by relative motion toward one another of the mold walls.

Other objects of the invention are to provide a mold of the character described wherein one of the mold walls is fixedly positioned and the wall opposed thereto is mounted for motion with respect thereto; to provide in molds of the character described means for accurately positioning and centering the movable mold walls during the formation of the lens or like optical element within the mold; to provide in such molds means for so mounting the movable elements as to reduce to a minimum inertia, friction and like forces tending to impede motion thereof; and to provide in connection with such molds a thin pellicle or collapsible skin as the mold wall joining the mold elements which form the light-transmitting surfaces of the molded plastic element.

Other objects of the invention will in part be obvious and will in part appear hereinafter.

The invention accordingly comprises the features of construction, combination of elements, and arrangement of parts which will be exemplified in the construction hereinafter set forth and the scope of the application of which will be indicated in the claims.

For a fuller understanding of the nature and objects of the invention, reference should be had to the following detailed description, taken in connection with the accompanying drawing, in which:

Figure 1 is a view in perspective of a mold embodying one form of the invention;

Figure 2 is a view in vertical section of the mold shown in Fig. 1;

Figure 3 is a view in vertical section of a further embodiment of the invention; and Figure 4 is a detail view showing a stop device suitable for use with the molds of the invention.

In the manufacture of molded optical elements, such for example as lenses, from synthetic plastics, resins and like materials, extreme difficulty has arisen in the production of optical elements of uniform properties because of shrinkage of the plastic material within the mold during polymerization thereof. This shrinkage has given rise to strains within the polymerized material, and in many instances to deformation of the surface or surfaces of the molded optical element or even to breakage of the mold by reason of the tendency of the molded plastic to pull away from the surface of the mold during polymerization. This invention is concerned primarily with the provision of an improved mold for use in the manufacture of plastic lenses, and it is a principal feature of the invention to provide a mold wherein the mold walls which form the light-transmitting surfaces of the lens are so mounted that during polymerization of the plastic within the mold and shrinkage of the plastic as a result thereof the mold walls may move toward each other to compensate for shrinkage of the plastic, to prevent the setting up of appreciable strain within the molded lens and to insure that the surfaces of the molded lens will conform accurately and precisely to the surfaces of the mold walls. It is an additional feature of the present invention to provide in such a mold a connecting pellicle or membrane joining the relatively heavy walls of the mold and serving to enclose the plastic material as it is introduced into the mold, this membrane being of such character as to conform readily to any alteration in form or shape required by shrinkage of the plastic within the mold, and particularly being of such character as not to impede the free motion of one or both of the mold walls during polymerization of the plastic lens.

Preferred materials for use in the production of plastic lenses and similar elements are such synthetic plastics as methyl methacrylate, styrene, cyclohexyl methacrylate, and similar materials. A considerable number of new plastics have been developed which may be employed if desired to impart special features of hardness or clarity to the finished molded optical element. It is a common characteristic of all these materials that as they are polymerized they contract and shrink. The mold of the present invention is intended for use with any and all of these plastic materials.

In the production of molded optical elements formed of synthetic plastics a preferred practice is to partially polymerize the plastic material before introducing it into the mold. Preferably this initial polymerization should be carried forward to a point where the material is still sufficiently fluid to be introduced into the mold either by pouring or by injection into the mold, as for example from a syringe, but should not progress to substantially the point where the plastic begins to set or harden. When the mold has been filled with the partially polymerized plastic it is heated to a suitable temperature and the polymerization of the plastic within the mold is carried forward to substantial completeness.

In the embodiment of the invention shown in Figs. 1 and 2, 10 and 12 represent the two halves of a lens mold. These elements may preferably be formed of blocks of glass with the inner and opposed surfaces ground to the desired curvature and so finished as to provide optically smooth surfaces on the molded plastic lens. Each of the mold halves 10, 12 is held in a mounting 14, 16 which may, for example, be tubular in shape, as shown in the drawing. The shape of the mounting elements is not important. A tubular shape is preferred because of the ease of centering the mold halves and assuring proper alignment of the molded elements. Extreme accuracy in aligning or centering the mold halves is particularly important in the casting of lenses with aspherical surfaces, and if the two faces of the lens are not initially concentric they can never both be made concentric with the lens edge by which it must be mounted.

Each of mounting elements 14, 16 is provided with substantially frictionless mounting means. As is shown in Figs. 1 and 2, said means may comprise a plurality of ball bearings 18, for example four, resting in accurately cut parallel grooves 20 in a suitable base plate 22. However, other similar substantially frictionless mounting means may be used. For example, instead of balls 18 there may be used two or more rods arranged in parallel relation with each other and with the mold elements. Such a mounting is particularly useful in the case of relatively small molds, since their weight will be relatively low and little sliding friction will result. Alternatively, each of the mold elements might rest in a single V-groove cut in a base plate 22 of sufficient thickness.

Means are provided, for example the straps 24 and the clamping screws 26, to hold each of the mounting elements 14 and 16 against movement with respect to the other element during the introduction of the plastic material into the mold. The clamping screws are releasable, and the release of either or both will allow the mold walls or mold halves 10, 12 and their associated mounting elements 14, 16 to move toward or away from each other on a substantially frictionless mounting.

In preparing the mold for use, the mold halves 10, 12 are moved toward one another until they are the desired distance apart. They are then held in position by tightening the screws 26. A thin tape 28 is then placed around the circumference of the mold halves to form a closure and to provide a mold cavity with a suitable filling hole at the top. The plastic which is to comprise the molded lens is then introduced into the mold, for example by extrusion from a syringe or other suitable device with which the tape 28 is pierced. As previously pointed out, the plastic at this stage of the molding process is preferably in the monomeric or partially polymerized state, and in any event sufficiently fluid to be readily introduced into the molded cavity.

When the mold is sealed, the clamping screws 26 are released and the mold is heated to advance the polymerization of the plastic. As polymerization progresses the plastic material within the mold shrinks. During the period of shrinkage, which is prior to complete polymerization, the plastic adheres fairly vigorously to the mold walls. Where the mold halves are mounted for substantially frictionless motion toward one another, they are drawn together during the period of polymerization. Inasmuch as the molded lenses are relatively thin with respect to their diameter, maximum shrinkage takes place in a direction substantially parallel to the axis of the tubular supporting elements 14, 16. As a result, the motion of the mold halves in the direction of the axis during the shrinkage of the plastic within the mold compensates for substantially all shrinkage and eliminates strain in the finished molded lens. It is to be understood that the thin tape, or pellicle 28, is of a character to crumple or wrinkle readily as the mold halves move towards each other so that free motion of the molding elements is not in any way retarded by the tape.

When polymerization is substantially complete the tape 28 is removed and the mold halves easily separated, the completely polymerized plastic having little or no tendency to adhere to the polished mold walls.

With an arrangement of parts such as has been described, extremely accurately molded plastic lenses with substantially uniform optical properties may be readily and rapidly produced with relatively little cost for molding elements.

A modified form of the invention is shown in vertical section in Fig. 3. Here 30, 32 represent the mold halves, each of which is held in a suitable mounting element 34, 36. These elements, as shown, may take the form of mounting rings. One of these rings, for example 34, may be formed integral with a shaft 38, slidably mounted in a bearing 40. Means are provided for locking the shaft 38 in the bearing 40 and these means may take the form of a lock screw 42. The other mounting ring 36 may be slidably mounted on a spindle 44 and may normally rest against shoulder 46 at the base of the spindle. As in the embodiment of the invention shown in Figs. 1 and 2, a thin tape or pellicle 48 is employed to form the mold cavity when it is wrapped around the circumference of the mold halves 30, 32.

In the operation of the device the mounting ring 36 is first moved upon spindle 44 until it is seated against shoulder 46. The mounting ring 34 and its associated mold half 30 are then advanced toward mold half 32 until they are the desired distance therefrom. Shaft 38 is then locked in bearing 40, the mold cavity is completed by the addition of the tape 48, the plastic material is introduced into the mold in the manner previously described, polymerization of the plastic within the mold is carried forward by heating, and the plastic shrinks during polymerization. In this embodiment of the invention, as the plastic shrinks, mold half 32 with its mounting ring 36 is drawn toward the element 30, sliding freely upon spindle 44.

It has sometimes been found desirable with the molds of the present invention to use some sort of stop means for the purpose of predeterminedly limiting the amount of relative movement of the mold parts during polymerization of the plastic. An example of a suitable stop device 50 is shown in Fig. 4 and is also indicated in dotted lines in Fig. 1. Stop 50 comprises a plurality of rods or bars 52 connected by a pair of yoke elements 54. As is shown in Fig. 1, yokes 54 are adapted to rest on mold halves 10 and 12 and to hold bars 52 between adjacent ends of mounting elements 14 and 16. The length of bars 52 is determined by the desired thickness of the lens to be produced, and said length is preferably such that the mold elements will be stopped positively at substantially the same distance apart as would be the case if they were allowed to stop naturally after all shrinkage of the plastic therewithin had ceased. It will be understood that other stop means may also be used, such for example as one or more pins fixed in one of elements 14 and 16 and adapted to engage the other of said elements.

It will be understood that many other embodiments of the invention will be apparent to those skilled in the art and are to be deemed to fall within the scope of the invention.

Since certain changes may be made in the above construction and different embodiments of the invention could be made without departing from its scope, it is intended that all matter contained in the above description or shown in the accompanying drawing shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

What is claimed is:

1. A mold of the character described for forming optical elements of synthetic plastics and like materials comprising, in combination, a plurality of mold walls with optically smooth molding surfaces, a readily deformable closure element for forming with said walls the mold cavity, means for mounting said mold walls for relative motion toward each other during the polymerization of plastic material within said mold, said mounting means comprising a track and substantially frictionless bearings for supporting thereon at least one of said mold walls.

2. A mold of the character described for forming optical elements of synthetic plastics and like materials comprising, in combination, a plurality of mold walls with optically smooth molding surfaces, a readily deformable closure element for forming with said walls the mold cavity, means for mounting said mold walls for relative motion toward each other during the polymerization of plastic material within said mold, said mounting means comprising a track and substantially frictionless bearings for supporting thereon both of said mold walls.

3. A mold of the character described for forming optical elements of synthetic plastics and like materials comprising, in combination, a plurality of mold walls with optically smooth molding surfaces, a readily deformable closure element for forming with said walls the mold cavity, means for mounting said mold walls for relative motion toward each other during the polymerization of plastic material within said mold, said mounting means comprising a track and substantially frictionless bearings for supporting thereon at least one of said mold walls, and releasable clamping means for fixedly positioning said walls with respect to each other.

4. A mold of the character described for forming optical elements of synthetic plastics and like materials comprising, in combination, a plurality of mold walls with optically smooth molding surfaces, a readily deformable closure element for forming with said walls the mold cavity, and means for mounting said mold walls for relative motion toward each other during the polymerization of plastic material within said mold, said mounting means comprising releasable clamping means for holding one of said walls fixedly and means permitting restricted motion of the other of said walls.

5. A mold of the character described for forming optical elements of synthetic plastics and like materials comprising, in combination, a plurality of mold walls with optically smooth molding surfaces, a readily deformable closure element for forming with said walls the mold cavity, said walls being concentrically mounted in wall-holding elements, one of said wall-holding elements being supported by a spindle releasably clamped in a bearing, the other wall-holding element being slidably mounted for restricted motion toward and away from the first mentioned wall-holding element.

6. A mold of the character described for forming lens elements of synthetic plastics and like materials comprising, in combination, a plurality of glass mold members having mold walls with optically smooth molding surfaces, supporting members for each of said mold members, the latter being centrally mounted in said supporting members, a readily deformable closure element for forming with said walls the mold cavity, and means for coaxially mounting said supporting members for substantially free axial movement relative to each other.

7. A mold of the character described for forming lens elements of synthetic plastics and like materials comprising, in combination, a plurality of glass mold members having mold walls with optically smooth molding surfaces, tubular supporting members for each of said mold members, the latter being centrally mounted in said tubular supporting members, a readily deformable closure element for forming with said walls the mold cavity, and means for coaxially mounting said tubular supporting members for substantially free axial movement relative to each other.

MURRY N. FAIRBANK.
DEXTER P. COOPER, Jr.